(12) United States Patent
Polzinger

(10) Patent No.: US 6,669,772 B1
(45) Date of Patent: Dec. 30, 2003

(54) METHOD FOR PREPARING AN ADHESIVE FOR CORRUGATED PAPERBOARD

(75) Inventor: Rudolf Polzinger, Steyr (AT)

(73) Assignee: BVG Bauer-Verfahrenstechnik GmbH, Greifengerg (DE)

( * ) Notice: Subject to any disclaimer, the term of this patent is extended or adjusted under 35 U.S.C. 154(b) by 0 days.

(21) Appl. No.: 09/700,151

(22) PCT Filed: May 11, 1999

(86) PCT No.: PCT/EP99/03227

§ 371 (c)(1),
(2), (4) Date: Mar. 15, 2001

(87) PCT Pub. No.: WO99/58621

PCT Pub. Date: Nov. 18, 1999

(30) Foreign Application Priority Data

May 14, 1998 (DE) .......................................... 198 21 786

(51) Int. Cl.$^7$ .............................................. C09J 103/02
(52) U.S. Cl. .................................. 106/217.2; 106/211.1
(58) Field of Search ............................ 106/211.1, 217.2

(56) References Cited

U.S. PATENT DOCUMENTS 3,622,388 A    11/1971   Larson
5,840,108 A  * 11/1998   Karras .................... 106/211.1
6,048,391 A  *  4/2000   de Valk et al. .......... 106/217.2

FOREIGN PATENT DOCUMENTS

| | | |
|---|---|---|
| JP | 56-047466 | 4/1981 |
| JP | 03-012470 | 1/1991 |
| JP | 09-328664 | 12/1997 |
| WO | WO9804643 | 2/1998 |

OTHER PUBLICATIONS

Chemical Abstracts, vol. 95, No. 10.(Sep. 7, 1981), Columbus, Ohio, US; abstract No. 82753, XP00214132.

Chemical Abstracts, vol. 114, No. 18, May 6, 1991, Columbus, Ohio, US; abstract No. 166659, XP002114133.

Patent Abstracts of Japan, vol. 098, No. 004, Mar. 31, 1998.

\* cited by examiner

*Primary Examiner*—David Brunsman
(74) *Attorney, Agent, or Firm*—Jordan and Hamburg LLP

(57) ABSTRACT

The invention relates to a process for preparing corrugated paperboard adhesive based on the STEIN-HALL process, in which case it is a batch process or continuous process and the viscosities of the carrier (carrier viscosity) and the finished corrugated paperboard adhesive (final viscosity) are measured online by a viscometer and are each controlled to a constant value (predetermined carrier viscosity $\eta'$, final predetermined viscosity $\eta''$).

8 Claims, 1 Drawing Sheet

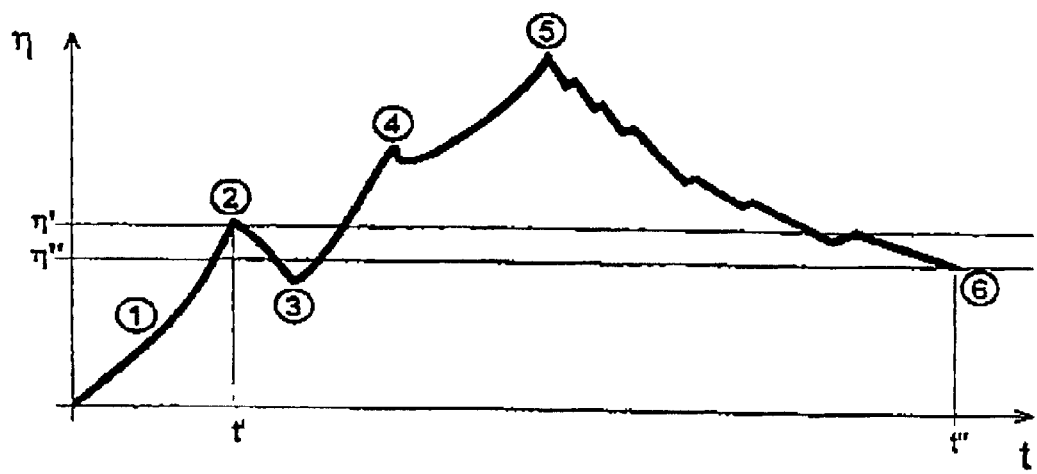

METHOD FOR PREPARING AN ADHESIVE FOR CORRUGATED PAPERBOARD

This application is a 371 of PCT/EP99/03227 filed May 11, 1999.

The invention relates to a process for preparing corrugated paperboard adhesive by controlling the viscosity of the carrier and of the finished adhesive to a fixed value (constant).

Corrugated paperboard adhesives have broad application in the production of corrugated paperboard. They are used when corrugated paper is glued to the liner. The glue used is preferably native starch. Native starch is the cheapest starting material for corrugated paperboard adhesive. In order to be able to use it, it is generally prepared by the STEIN-HALL process (U.S. Pat. No. 2,102,937). In this process a carrier is first prepared (gelatinized starch), also termed primary starch, which is then enriched with native starch as glue, also termed secondary starch, and other substances (for example borax, wet strength agent and modified starches).

The carrier (primary starch) is generally prepared in a vessel which is situtated on a balance and in which first a defined amount of water is introduced (batch process). A defined amount of native starch then follows as carrier starch, which is suspended in the water which has been introduced. This starch is gelatinzed by addition of alkali, generally in the form of sodium hydroxide solution (starch has the property of cold gelatinization at a defined alkalinity—approximately pH 13). In the STEIN-HALL process, sodium hydroxide solution is added until all of the carrier starch is gelatinized. In practice, it has been found that it is frequently better not to gelatinize all of the carrier starch, but only a part thereof. In this case one speaks of the "Minocar process". The size of this part is determined by the viscosity of the gelatinized carrier. In order to know constantly the viscosity of the carrier during the process. the viscosity must be measured online. Therefore, in the inventive proposal, an online viscometer is built into the makeup vessel. The controlled member x forms the viscosity, the actuator y forms the amount of sodium hydroxide solution added and the characteristic viscosity for each gelatinized carrier is a constant, the preset value w ($\eta=\eta'$).

Although a process, the Coromat process, is known, in which the viscosity of the carrier is also controlled by the addition of sodium hydroxide solution, in this case the conditions are considerably more complicated The critical difference is that the total amount of water is added at the start of the batch process. It is thus no longer possible to prevent further increase in viscosity by decreasing the alkalinity when the preset viscosity of the carrier is achieved. In order, nevertheless, to be able to control the system to a preset value w, in this process the preset value curve (this is not a constant here) is controlled upwards and downwards when the tolerance of the desired final viscosity is exceeded or undershot by more than ±1%. This shift in final viscosity then forms a new preset value curve. A disadvantage of this known process is that corrections must be constantly carried out to the preset value viscosity, and the desired preset value is virtually never achieved. This control led deviation becomes the greater the more initial parameters are varied, for example by using varying amounts of washwater and of ink wastewater. These waters can have very different pHs and can thus considerably effect the carrier viscosity.

According to the invention the known process is to be further developed and made more effective and more economic. According to the invention the viscosity of the corrugated paper board adhesive is measured and controlled during the production process using an online viscometer, that is to say in such a manner that the preset value w of the viscosity of the carrier is a constant $\eta'$ which is achieved by adding alkali in a defined reaction time t' (preset reaction value). In this case an alkali pump is the actuator y. The controlled member x is the respective viscosity $\eta$ which is established by addition of alkali. When the preset viscosity $\eta'$ is reached at the end of the reaction time t', a further increase in viscosity is prevented by adding a defined amount of water (secondary water). After addition of adhesive starch (secondary starch) and further additives (borax), the product is stirred using a dissolver agitator until a final viscosity $\eta'$ has been established. By means of the inventive process, corrugated paperboard adhesives having various viscosities can be produced. Each adhesive is based on a characteristic carrier viscosity and final viscosity which are preset as fixed values (constant). In this manner, the carrier viscosity and final viscosity remain independent of external influences. The respective predetermined viscosity is deposited in a formula management system.

In particular, by means of the inventive process, preferably corrugated paperboard adhesives may be produced reproducibly which comprise any desired proportions of washwater and flexography water By controlling the viscosity of the carrier, their effects on the viscosity of the carrier are ruled out.

The inventive process will be described below with reference to the accompanying drawing.

BRIEF DESCRIPTION OF THE DRAWING

In the inventive process (VCC process, where V=viscosity; C=controlled and C=carrier) the predetermined viscosity of the carrier $\eta'$ is constant and is thus independent of external influences. The preset viscosity value $\eta'$ is achieved by stepwise addition of sodium hydroxide solution using the sodium hydroxide solution pump. The time in which the addition takes place is the reaction time t'. This time t' is preset as the predetermined reaction time and is deposited in the formula management system. When the preset viscosity value $\eta'$ is reached, a defined amount of secondary water is added (see the graph). This leads to a decrease in viscosity and alkalinity. As a result, no further starch granules can gelatinize—the increase in viscosity is stopped. This is very important for the reproducibility of the process from batch to batch.

After addition of the secondary water, adhesive starch (secondary starch) is added. In the course of this the viscosity increases again markedly. Finally, borax is added with a further increase in viscosity.

All of the products are thus introduced into the batch. There then follows the stirring time in which, by shearing with the dissolver agitator, the viscosity of the stirred material is slowly reduced. The stirring is continued until the viscosity of the entire batch has fallen to the final predetermined viscosity $\eta'$. The batch is then complete.

The corrugated paper board adhesive is then complete and can be passed on for further processing.

List of Designations

1. Addition of NaOH
2. Reaching the predetermined carrier viscosity $\eta'$ in reaction time t' Addition of secondary water
3. Addition of secondary starch
4. Addition of borax
5. End of borax addition Start of shearing time 6. Reaching the final predetermined viscosity $\eta''$ $\eta$ viscosity in mPs t tire in s

What is claimed is:

1. Process for preparing corrugated paperboard adhesive based on the STEIN-HALL process, wherein the process is a batch process or continuous process and the viscosity of the carrier $\eta'$ and final viscosity of the finished corrugated paperboard adhesive $\eta''$ are measured online by a viscometer and are each controlled to a constant value.

2. Process according to claim 1, wherein the carrier viscosity is controlled by addition of alkali.

3. Process according to claim 2, wherein the alkali is sodium hydroxide solution.

4. Process according to claim 1, wherein the carrier viscosity $\eta'$ is reached in a defined reaction time t designated t'.

5. Process according to claim 1, wherein when the carrier viscosity $\eta'$ is reached, a defined amount of secondary water is added.

6. Process according to claim 5, wherein the carrier viscosity $\eta'$, the reaction time t', the final $\eta''$ and the amount of secondary water are deposited in a formula management system.

7. Process according to claim 6, wherein any desired proportions of washwater and ink wastewater can be used to prepare the corrugated paperboard adhesive, these proportions also being deposited in the formula management system.

8. Process according to claim 1, wherein the final viscosity $\eta''$ is achieved by mechanical shearing.

* * * * *

UNITED STATES PATENT AND TRADEMARK OFFICE
CERTIFICATE OF CORRECTION

PATENT NO.    : 6,669,772 B1
DATED         : December 30, 2003
INVENTOR(S)   : Rudolf Polzinger It is certified that error appears in the above-identified patent and that said Letters Patent is hereby corrected as shown below:

<u>Title page,</u>
Item [73], Assignee, change "BVG Bauer-Verfahrenstechnik GmbH, Greifengerg (DE)" to -- BVG Bauer-Verfahrenstechnik GmbH, Greifenberg (DE) --

Signed and Sealed this

Eleventh Day of May, 2004

JON W. DUDAS
*Acting Director of the United States Patent and Trademark Office*